Dec. 23, 1969    J. E. KRYSIAK    3,485,542
DESIGN OF A HOLLOW BALL TO BE EMPLOYED IN BEARING
Filed July 2, 1968
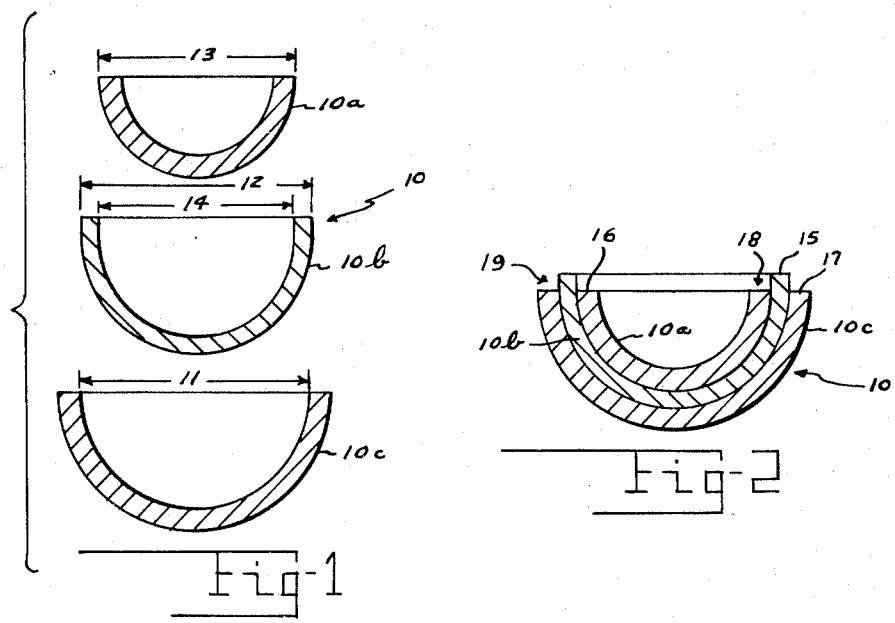
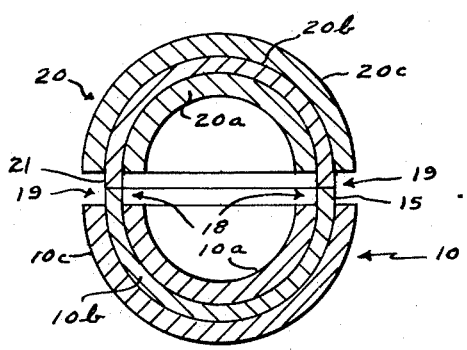
INVENTOR.
JOSEPH E. KRYSIAK
BY Harry A. Herbert Jr
ATTORNEY
Arthur R. Parker
AGENT

United States Patent Office

3,485,542
Patented Dec. 23, 1969

3,485,542
DESIGN OF A HOLLOW BALL TO BE EMPLOYED IN BEARING
Joseph E. Krysiak, 510 Wilmington Ave., Dayton, Ohio 45420
Filed July 2, 1968, Ser. No. 742,091
Int. Cl. F16c *33/30;* B21h *1/12;* B21k *1/14*
U.S. Cl. 308—188    8 Claims

ABSTRACT OF THE DISCLOSURE

A hollow ball construction for use in a bearing, and consisting of two hemispheres welded together to form a unitary structure with each hemisphere comprising a series of relatively thin, abutting shells arranged in nested relation to each other to thereby form a laminated hollow ball configuration.

BACKGROUND OF THE INVENTION

This invention relates generally to the field of hollow ball construction and, in particular, to a hollow ball of laminated configuration suitable for use in a bearing structure.

Previous ball bearing designs have included either solid structures, or single-shelled configurations in which two hemispheres have been welded together. In the latter, a "flash" or excessive amount of welding material has formed along the common welded seam therebetween. This "girth" weld naturally forms a bulge around the middle of the bearing to thereby create an excessive amount of friction between it and the bearing raceways. Also, this extra welding material, which, in the usual situation, is formed on both the interior and exterior walls of the hollow ball structure, has the effect of creating a dynamic instability. Moreover, with the use of the single hemisphere, the walls of the said ball must be thickened to meet the strength required for its application in a bearing structure. The unique arrangement of the present invention eliminates, or, at least substantially alleviates, the problems inherent in the foregoing disadvantages and, in turn, offers significant improvement thereover, as will become readily apparent from the following summary and detailed description thereof.

SUMMARY OF THE INVENTION

A principal object of the present invention resides, therefore, in the development of a new and improved hollow ball construction for use in a bearing, and which is of a laminated configuration and is therefore of increased strength and yet relatively lightweight and thinner in cross section.

A further object of the invention is in the utilization of a novel laminated hollow ball structure incorporating a series of individual shells welded together and of varying radii and thereby forming both internal and exterior pockets adapted to capture the flowing welded material thereinto and thus eliminate the usually formed girth weld inherent in nonlaminated types of hollow ball construction.

Other objects and advantages of the invention will appear from the following disclosure.

BRIEF DESCRIPTION OF THE DRAWING

FIGURE 1 is an exploded view in cross section of the several shells comprising one of the pair of hemispheres forming the hollow ball structure of the present invention;

FIGURE 2 is another sectional view of the several shells of FIGURE 1, showing the assembly thereof into one of the hemispheres of the invention; and FIGURE 3 is still another sectional view, illustrating the hemisphere of FIGURE 2 welded to an identical hemisphere to thereby show the completed hollow ball construction of the present invention.

DESCRIPTION OF THE PREFERRED EMBODIMENT

Referring generally to the drawing and, in particular, to FIGURE 1 thereof, one of the identical hemispheres forming the improved hollow ball structure of the present invention is shown generally at 10, in exploded form, as including a series of three individual shells, respectively, consisting of an inner shell at 10*a*; an intermediate or central shell at 10*b*; and an outer shell at 10*c*. These shells, which may be made of a relatively thin thickness, are formed with vary diameters with the inside diameter, depicted at 11, of outer shell 10*c* made just equal to the outside diameter, at 12, of intermediate or central shell 10*b*. In turn, the outside diameter, at 13, of inner shell 10*a*, is made exactly equal to the inside diameter, at 14, of said intermediate shell 10*b*. In this manner, the several shells 10*a*, 10*b* and 10*c* are arranged in abutting and nested relation to each other when they are assembled together and welded to form one of the pair of hemispheres comprising the inventive hollow ball configuration, as is particularly illustrated in FIGURE 2, for example.

The laminated construction form of the present invention is clearly seen in the above-mentioned FIGURE 2. It is the application of this laminated configuration to the hollow ball construction which forms a principal and unique feature of the present invention. FIGURE 2 also illustrates another improved and novel feature of the present arrangement by its clear illustration of the intermediate or central shell 10*b* being formed with an extension or protruding edge, as indicated at 15, on its diameter or open upper surface. With this unique arrangement and with both the inner and outer shells formed with upper surfaces at 16 and 17, respectively, which are even with each other and, therefore, oriented with their diameters or upper surfaces arranged at the same distance below the extension or protruding upper edge 15 of said intermediate or central shell 10*b*, a novel inner and outer recessed area or pocket is thereby formed at 18 and 19, respectively, on both sides of the welded area between the two hemispheres comprising the present invention and seen particularly at 10 and 20 in FIGURE 3.

In the aforesaid FIGURE 3, it is seen that the present hollow ball construction consists of the previously-noted pair of hemispheres 10 and 20. Since these hemispheres are identical in construction, the hemisphere 20 likewise includes inner, intermediate or central, and outer shells, indicated respectively at 20*a*, 20*b* and 20*c*. Hemisphere 20, of course, further includes its own extension, or protruding edge at 21, which with the protruding edge 15 of hemisphere 10 collectively forms the previously-described recessed area or inner and outer pockets 18, 19 therebetween. With the foregoing arrangement, the present hollow ball is formed by the two laminated hemispheres 10, 20 being joined by means of welding along the respective protruding edges 15 and 21 of their intermediate or central shells 10*a* and 20*a*. The welding material then is able to flow into the above-described recessed areas or inner and outer pockets 18, 19 formed on both sides of the aforesaid protruding edges 15 and 21 and, in this unique manner, uniform interior and exterior ball surfaces are produced. Of course, the thin-walled hemispherical shells 10*a*, 10*b*, 10*c*, and 20*a*, 20*b*, and 20*c* of each of said pairs of hemispheres 10 and 20 are first assembled or nested within one another after being initially made with the requisite increasing radii and with the intermediate or central shells 10*b* and 20*b* being formed with the previously-described extension or protruding edges 15 and 21.

The next step in the assembling of the present hollow ball structure is to place the aforementioned nested hemispheric shells either in an inert gas atmosphere, or in a high vacuum and thereafter welding them into the respective laminated hemispheres 10, 20, either by means of electric welding, diffusion bond welding, or some other appropriate form of welding. Naturally, the shells should be absolutely clean of contaminants before the welding operation occurs.

The two laminated hemispheres 10 and 20 are next placed, again in an inert gas atmosphere, or high vacuum and subsequently welded into the novel hollow ball structure of the present invention, as noted hereinbefore. Finally, the ball so formed is appropriately stress relieved and the completed ball structure is then ready for use.

Thus, a new and improved lightweight, relatively thin-walled in total cross section and, yet, strong enough hollow ball to act in a bearing structure, and an improved method of fabricating the same, has been produced by the unique laminated hollow ball construction of the present invention.

I claim:
1. In means for fabricating a relatively lightweight, hollow ball member from a pair of hemispheres welded together into a spheroid configuration and being capable of withstanding relatively higher ball loads and stresses, the steps comprising; forming each of the pair of hemispheres from a plurality of individual laminated layers; integrally forming the laminations of each hemisphere with an upstanding circumferential projecting surface surrounding the midportion thereof, and thereby providing circumferentially-oriented, welding material-receiving and capturing, recessed and communicating pockets on both inner and outer wall surfaces of each of said hemispheres; welding together each of the plurality of individual laminated layers in an inert gas atmosphere or high vacuum environment and thereby forming a combined, single laminated structure representing a respective hemisphere; placing both laminated hemispheres so formed in a similar inert gas atmosphere, or high vacuum environment; and joining said laminated hemispheres as by welding together in a unitary-type structure along the two upstanding circumferential, projecting surfaces integrally formed on said pair of hemispheres comprising the hollow ball member being thereby fabricated.

2. In means for fabricating a relatively lightweight, hollow ball member as in claim 1, wherein the steps of forming each of the pairs of hemispheres from a plurality of individual laminated layers further comprises forming each of said hemispheres into a laminated construction from a series of relatively thin, hemispherical shells.

3. In means for fabricating a relatively lightweight, hollow ball member as in claim 2, wherein the series of hemispherical shells incorporated in said last-named step are arranged in close-fitting, nested relation within one another and are of varying radii.

4. In means for fabricating a relatively lightweight, hollow ball member as in claim 3, wherein the central shell of each of said series of hemispherical shells is formed with an integral protruding and circumferentially-disposed edge surface projecting beyond the remaining shells formed on opposite sides thereof to thereby form said welding material-receiving and capturing, recessed and communicating pockets.

5. A hollow ball member comprising a pair of hemispheric segments welded together into a spheroid configuration and each having an intermediately-positioned, protruding and circumferentially-arranged, integrally-formed edge surface welded to each other and forming communicating and recessed circumferential openings in both inner and outer wall portions of both of said pair of ball member-hemispheric segments to thereby provide for the plastic flow thereinto of the welding material formed during the welding operation and thus provide for substantially uniform inner and outer wall surfaces formed in said hollow ball member.

6. In a hollow ball member as in claim 5, wherein each of said ball member-hemispheric segments is made of a laminated construction and is thereby increased in relative strength a sufficient amount for its application in a bearing structure.

7. In a hollow ball member as in claim 5, wherein each of said hemispheric segments comprises a plurality of hemispherical shells welded together in close-fitting and nested relation to each other to thereby form a relatively light-weight laminated structure of considerably increased strength adequate to resist the loads and stresses normally inherent in a bearing arrangement.

8. In a hollow ball member as in claim 7, wherein each of said plurality of hemispherical shells incorporates a central shell having an integral outwardly extending edge surface formed in circumferential relation thereon and projecting beyond the edges of the remaining shells positioned on opposite sides thereof, said integral outwardly extending edge surface of the central shell of each series of hemispherical shells being welded to each other to thereby arrange the remaining hemispheric shells of one hemispheric ball member-segment in spaced-apart relation to that of the other hemispheric ball member-segment and thus form a peripherally-disposed pocket within both the interior and exterior wall surfaces of said hollow ball member, said peripherally-disposed pockets being adapted to receive and capture the overfow of plastic material thereinto resulting from the welding together of the two hemispheric segments forming said hollow ball member.

References Cited

UNITED STATES PATENTS 2,177,928   10/1939   Knudsen.
3,181,864   5/1965   Rolke.

MARTIN P. SCHWADRON, Primary Examiner

F. SUSKO, Assistant Examiner

U.S. Cl. X.R.

29—148.4